(12) United States Patent
Aoki et al.

(10) Patent No.: US 6,621,068 B2
(45) Date of Patent: Sep. 16, 2003

(54) OPTICAL ENCODER AND METHOD OF FABRICATING ITS SENSOR HEAD

(75) Inventors: Toshihiko Aoki, Kawasaki (JP); Toru Yaku, Kawasaki (JP); Tetsuro Kiriyama, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/891,404

(22) Filed: Jun. 27, 2001

(65) Prior Publication Data

US 2002/0008195 A1 Jan. 24, 2002

(30) Foreign Application Priority Data

Jul. 3, 2000 (JP) .......................................... 2000-200477

(51) Int. Cl.[7] .................................................. G01D 5/34
(52) U.S. Cl. .............................. 250/231.14; 250/237 G; 356/401; 356/616
(58) Field of Search ....................... 250/208.1, 234–236, 250/559.44, 559.46, 559.48, 559.4, 555, 557, 237 G; 358/473, 488, 497; 355/40, 41; 356/616–620, 401

(56) References Cited

U.S. PATENT DOCUMENTS

| 4,593,187 | A | * | 6/1986 | Grotts et al. ............. 250/208.1 |
| 4,607,168 | A | * | 8/1986 | Oritsuki et al. .......... 250/208.1 |
| 4,698,495 | A | * | 10/1987 | Kajiwara ................. 250/214.1 |
| 4,855,802 | A | * | 8/1989 | Kato ....................... 250/208.1 |
| 4,959,533 | A | * | 9/1990 | Yamazaki et al. ....... 250/208.1 |
| 5,323,001 | A | * | 6/1994 | Igaki et al. .............. 250/231.6 |
| 5,657,125 | A |   | 8/1997 | Kato et al. .................. 356/499 |

FOREIGN PATENT DOCUMENTS

| EP | 1 014 043 A1 | 6/2000 |
| GB | 2 352 811 A | 7/2001 |
| JP | A 9-51998 | 2/1997 |
| JP | A 10-253395 | 9/1998 |

* cited by examiner

*Primary Examiner*—David Porta
*Assistant Examiner*—Stephen Yam
(74) *Attorney, Agent, or Firm*—Oliff & Berridge, PLC

(57) ABSTRACT

An optical encoder is constructed by a reflection-type scale 1 and a sensor head 4. The sensor head 4 has an irradiation light source 2 and a sensor board 3, the sensor board 3 has a transparent substrate 30 on which light-receiving areas 5 for outputting displacement signals which have different phase with each other, and index gratings 6 for modulating the scale irradiating light are formed to be alternately arranged. The index gratings 6 are formed of the same material film as metal electrode of the light-receiving areas 5.

26 Claims, 11 Drawing Sheets

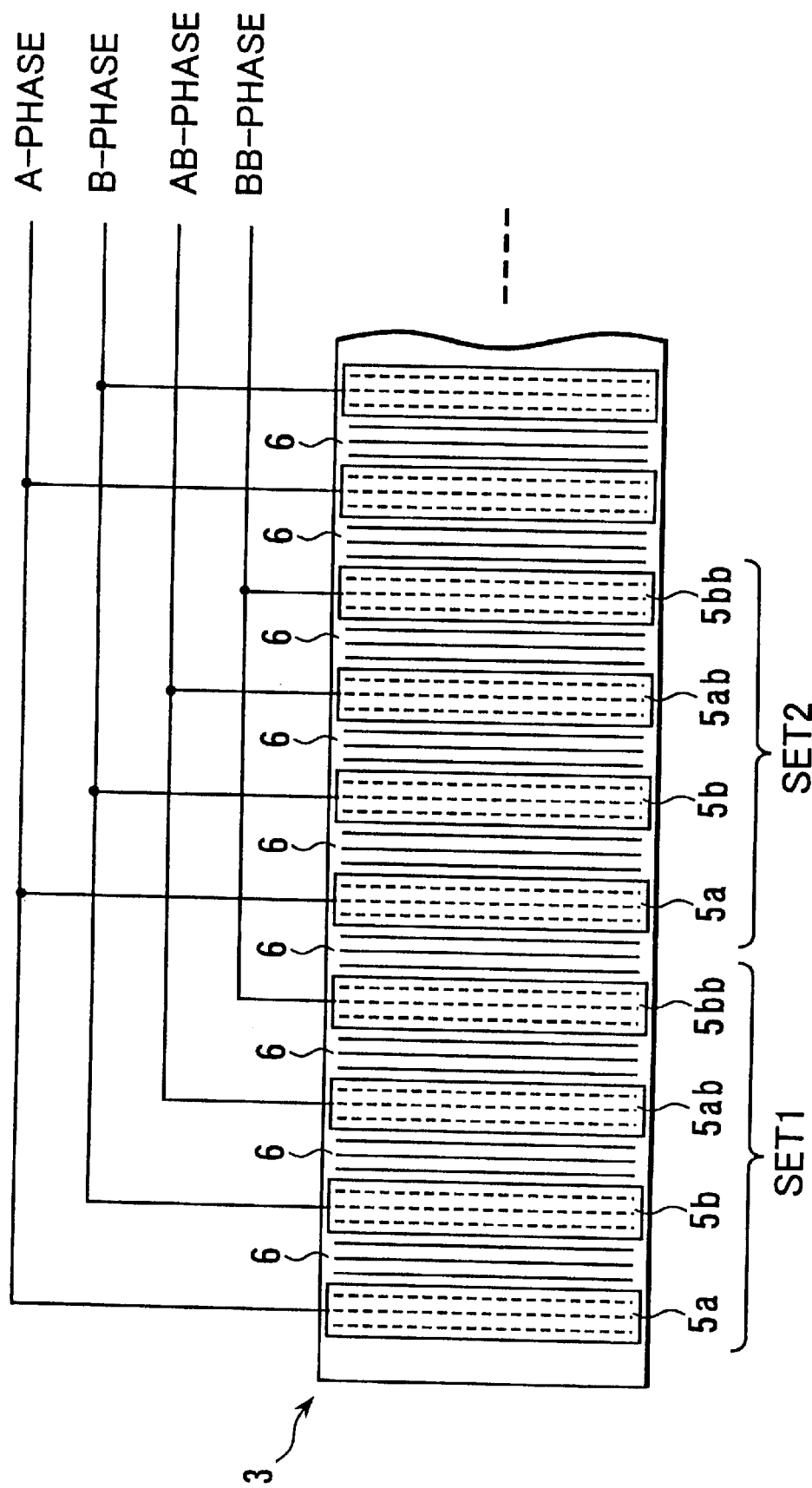

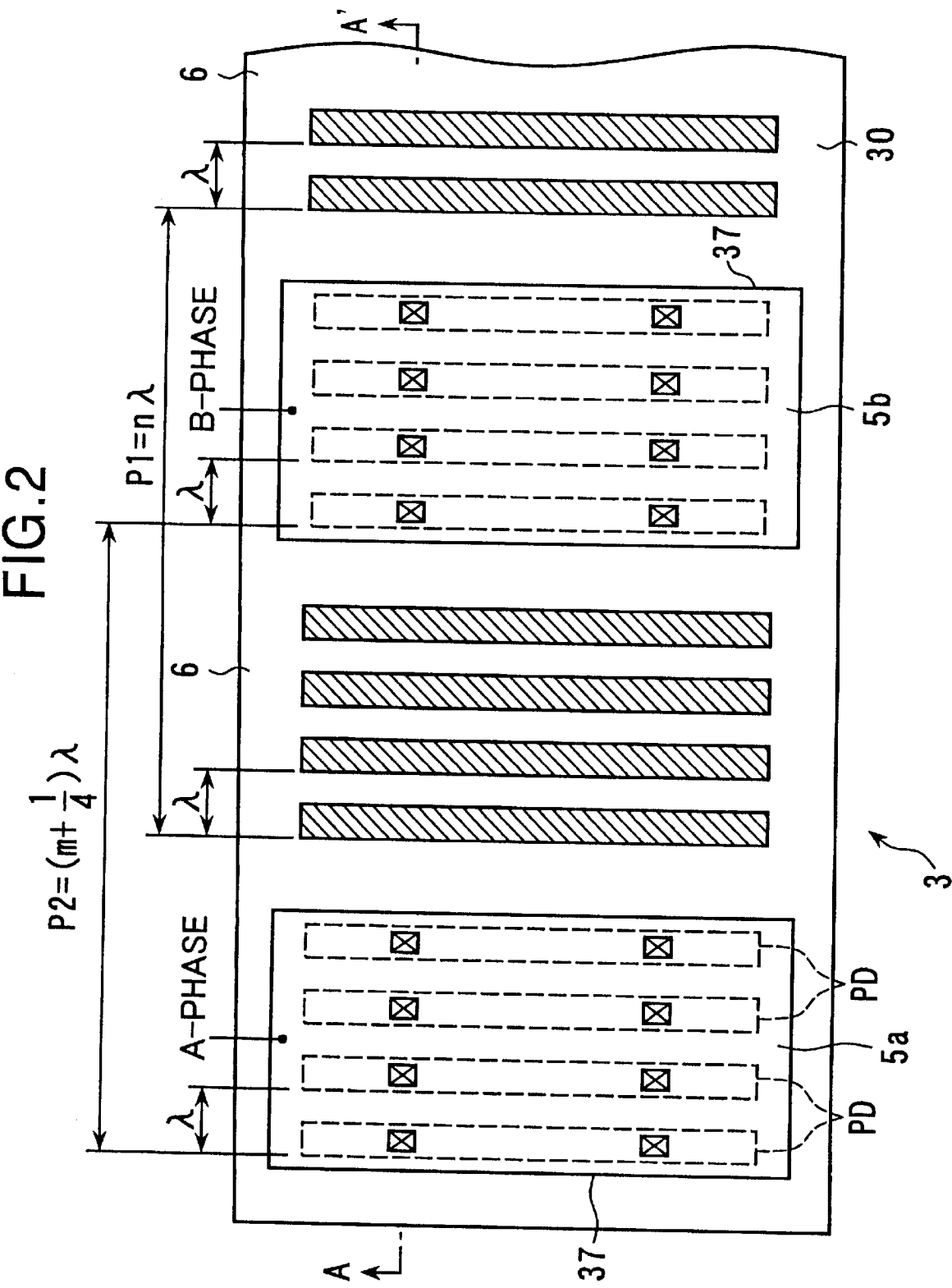

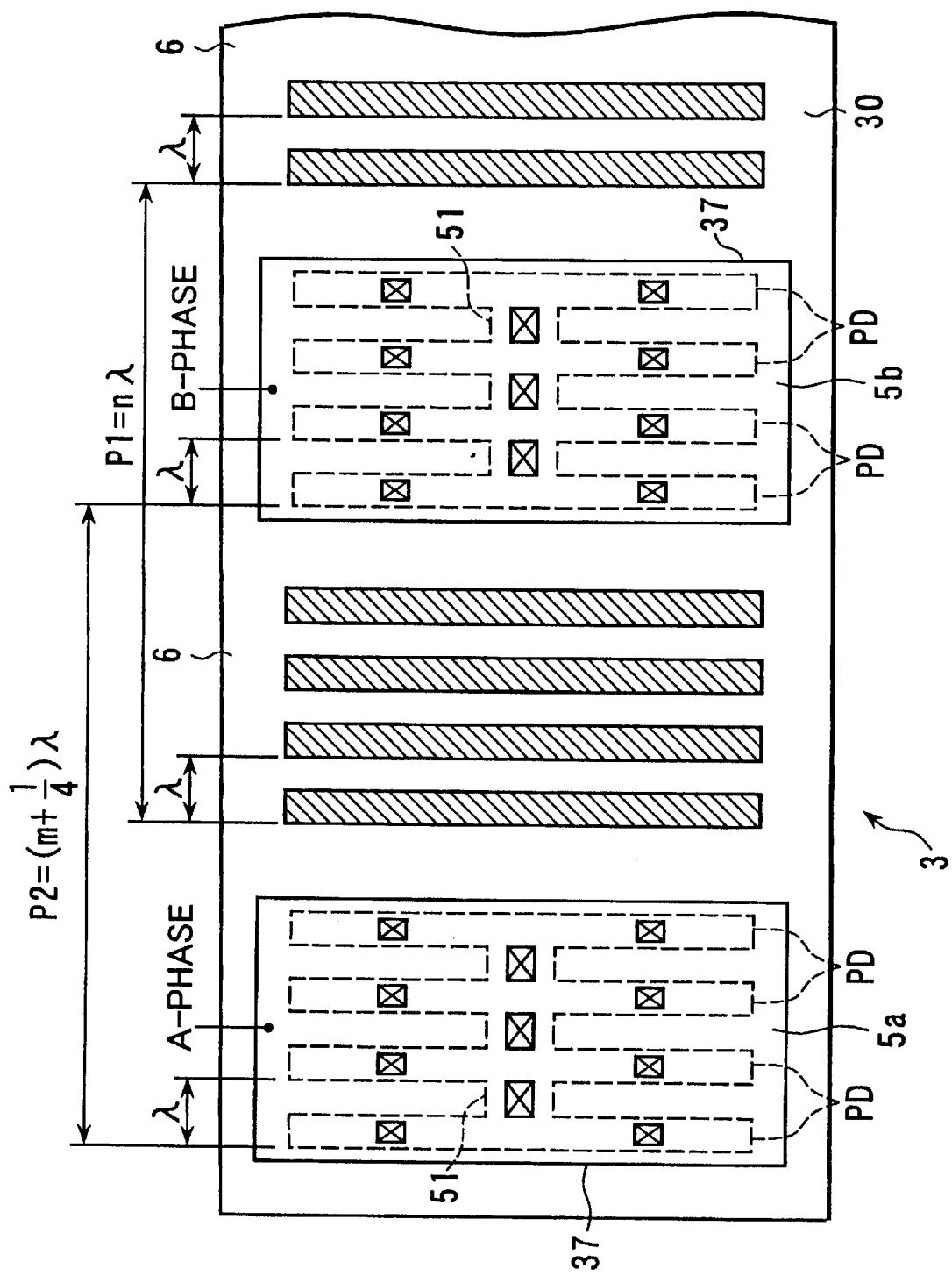

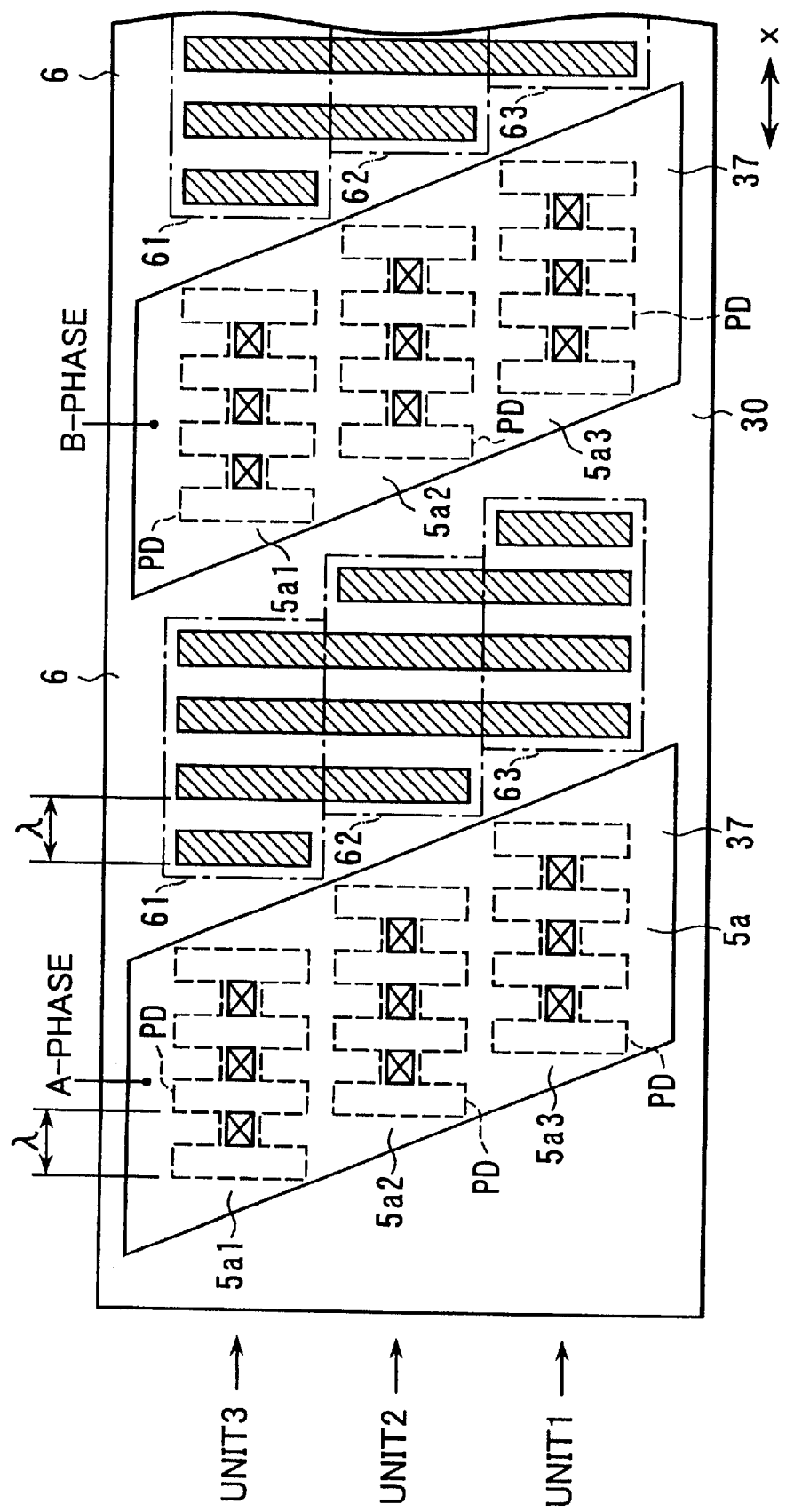

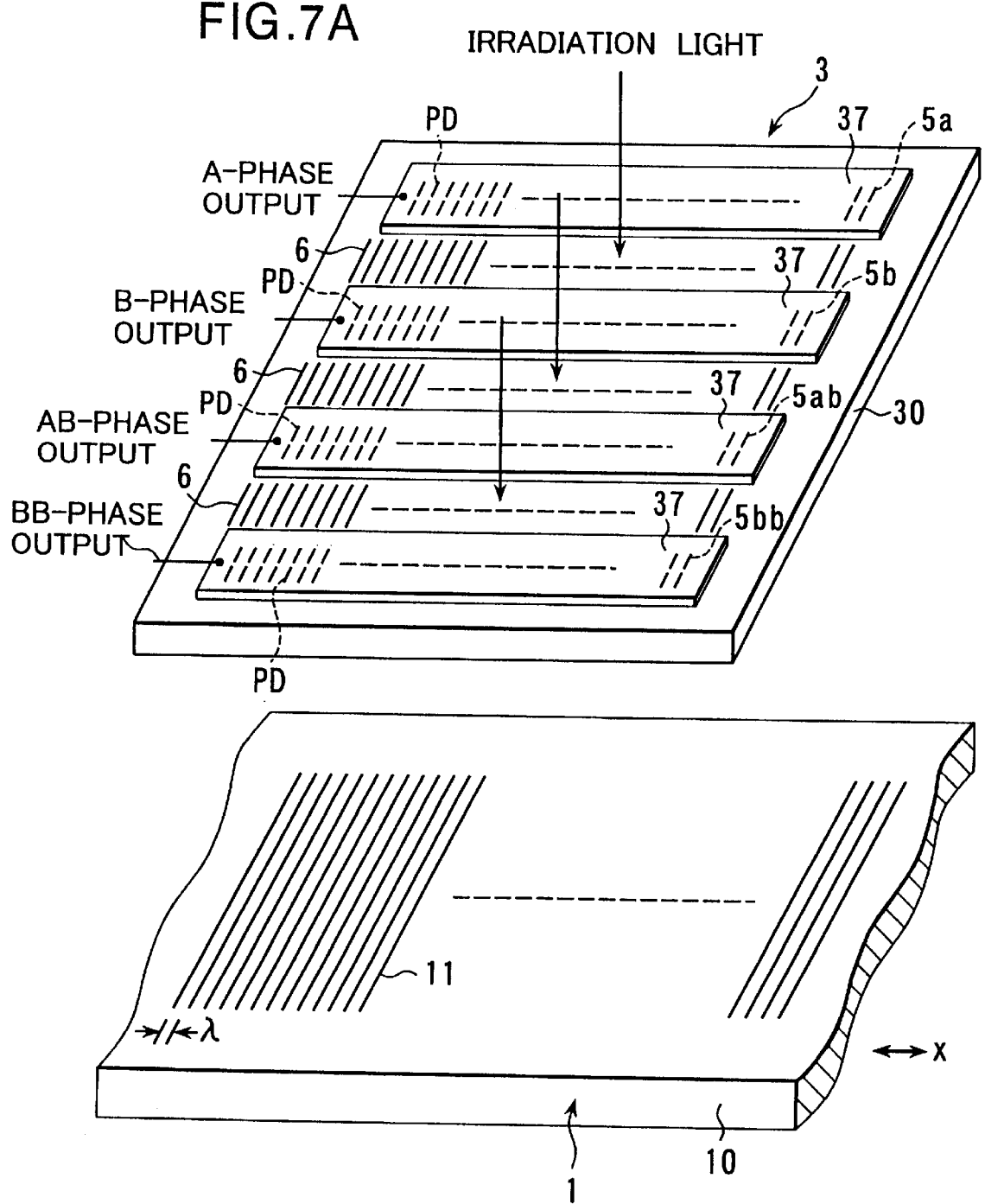

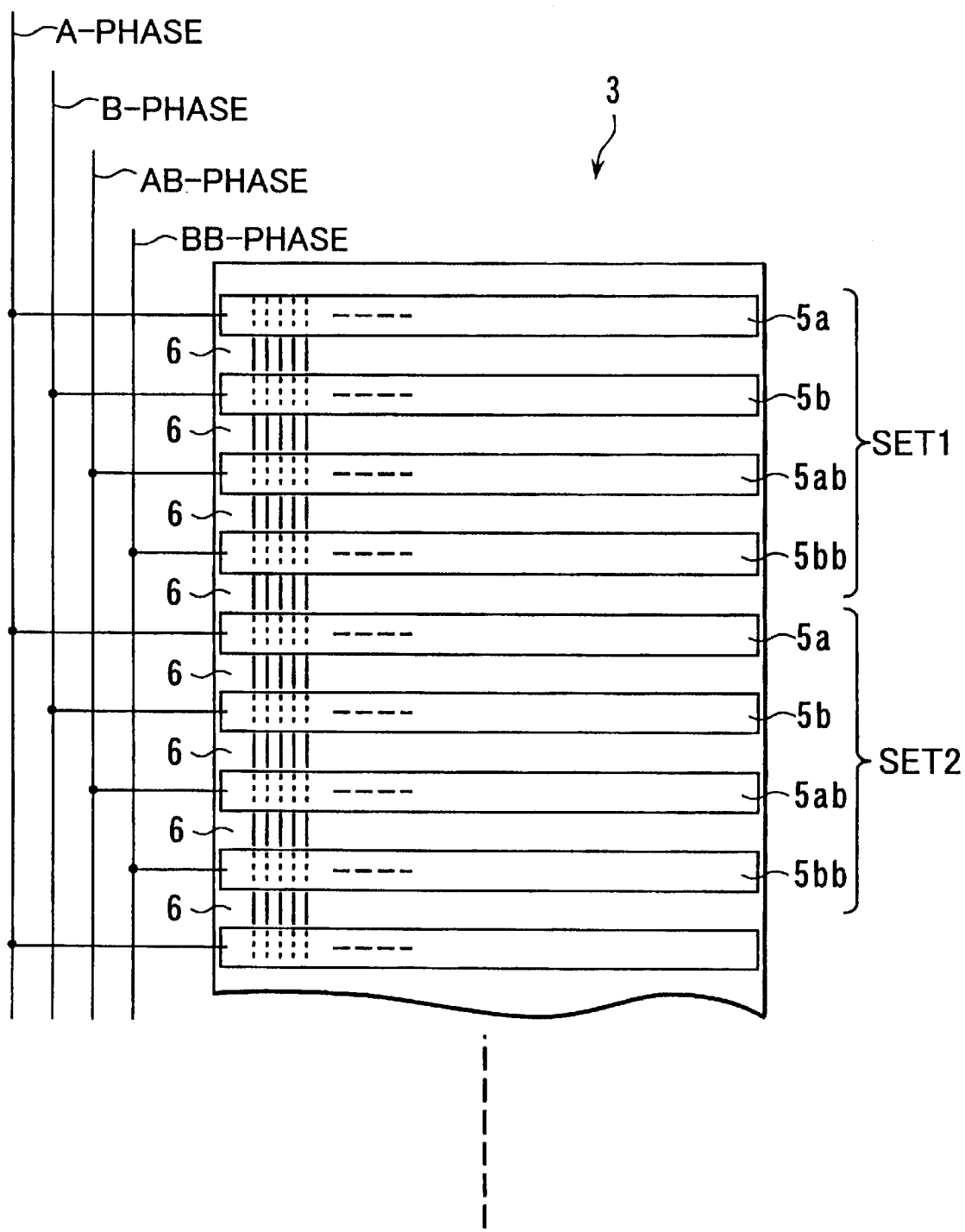

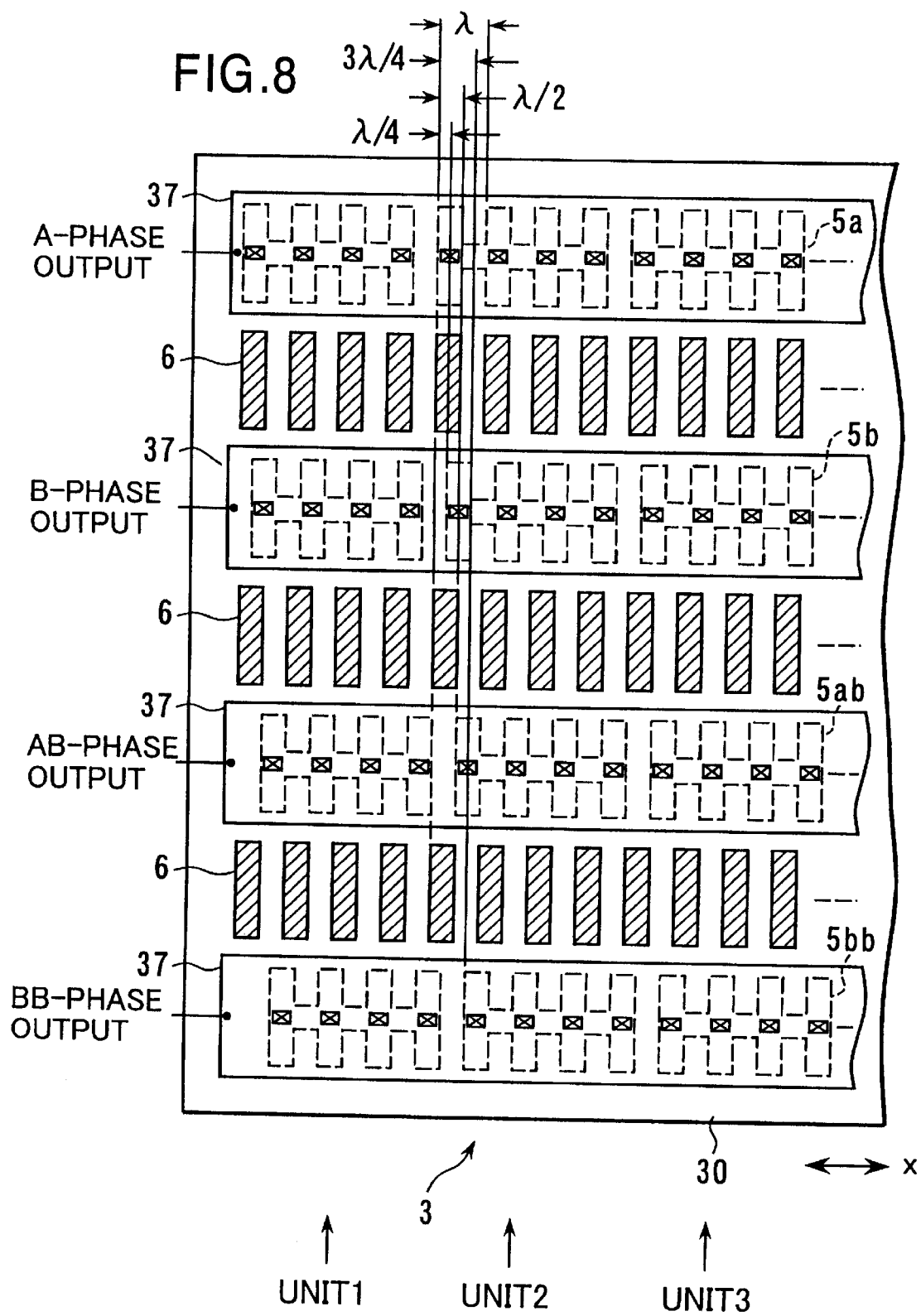

OPTICAL ENCODER AND METHOD OF FABRICATING ITS SENSOR HEAD

BACKGROUND OF THE INVENTION

1. Field of the Invention

This invention relates to an optical encoder, especially relates to the structure and the method of fabricating a sensor head in a reflection-type optical encoder.

2. Prior Art 3-grating system optical encoder has 1st optical grating (i.e., light source side index grating) for modulating scale irradiation light of a light source, 2nd optical grating which constitutes a scale grating on a scale, 3rd optical grating (i.e., light-receiving side index grating) and a light-receiving device for receiving the transmitted light from the 3rd optical grating to output displacement signals which have different phases with each other. In such the system, it is also known that the light-receiving device and the 3rd optical grating are integrally formed in a light-receiving device array.

In these optical encoders, when the scale is formed as a reflection-type scale, a light source part and a light-receiving part are disposed at one side of the scale as a sensor head. In this case, the light source side index grating and the light-receiving device array may be integrally formed on a common substrate, and it is desirable in respect of the ease of a miniaturization or manufacture. In such the reflection-type optical encoder, the applicant has proposed an encoder in which index gratings and light-receiving device arrays are arranged in mutually overlapping state, and method of right light-irradiation is used, as structure advantageous to especially a miniaturization (Japanese Patent Application (Kokai) No.9-51998). By this method, the optical encoder can be obtained with miniaturized scale, and the air gap can be made small, whereby the influence of a waviness can be reduced.

However, when a light-receiving element array and an index grating are formed in one sensor board with the domain with which it overlaps mutually, the structure of the sensor board will become complicated. Moreover, a manufacturing process will also become complicated supposing the manufacturing process of a light-receiving device array and the formation process of the index grating.

SUMMARY OF THE INVENTION

The present invention is to provide a small and highly efficient optical encoder, and provide the manufacture method of the sensor head of such the optical encoder.

An optical encoder of the present invention has a scale on which a reflection type scale grating is formed at a pitch in a measurement axis direction, and a sensor head for sensing the scale, the sensor head being disposed to be relatively movable along the measurement axis. The sensor head includes, a transparent substrate; a plurality of light-receiving areas which are arranged on the transparent substrate at an interval to output different phase displacement signals, respectively, each of the light-receiving areas having a plurality of light-receiving devices which are arranged in the measurement axis direction to output an identical phase displacement signal; and index gratings which are disposed between the light-receiving areas on the transparent substrate so as to modulate the scale irradiating light.

According to this invention, the sensor head of a optical encoder is constituted by a sensor board having a transparent substrate on which light-receiving areas and index gratings are alternately arranged. Each of the light-receiving areas includes a plurality of light-receiving devices. Since the domains of the index gratings and the light-receiving areas are not overlapped each other, this sensor board structure is simple. Therefore, a small reflection-type encoder can be obtained. Further, since the index gratings can be formed using the same material at least one of the metal electrode used for a light-receiving devices, and metal wiring, the manufacturing process of the sensor head also becomes easy.

In this invention, the light-receiving devices in each of the light-receiving area have a common transparent electrode formed on an obverse of the transparent substrate, the reverse being opposed to the scale. On the common transparent electrode, semiconductor layers are formed to be arranged in such a state that each of the semiconductor layers includes an light-sensitive domain. Metal electrodes are formed on the respective semiconductor layers, and an output signal line, which makes common connection of the metal electrodes, is also formed.

In this case, the semiconductor layers of the light-receiving devices in each light-receiving area may be separated mutually, or may be formed in such an integral structure as to have interconnection portions therebetween. Especially in the latter case, the output signal line can be contacted at the interconnetion portions with a low resistance.

Moreover, in this invention, when the light-receiving areas are arranged in a direction perpendicular to the measurement axis the light-receiving areas may be phase-shifted in the measurement axis direction by an integral multiple of the scale grating pitch. Thereby, the influence of the variation in the irradiation intensity of the scale width direction can be reduced.

According to the present invention, a method of fabricating the sensor head has the following processes; (a) forming a transparent electrode on a transparent substrate, (b) forming a semiconductor layer on the transparent electrode, the semiconductor layer including an light-sensitive domain therein, (c) forming a metal film on the semiconductor layer; and (d) patterning the laminated film of the metal film and the semiconductor layer to form light-receiving areas which are arranged at an interval to output different phase displacement signals, respectively, each of the light-receiving areas having a plurality of light-receiving devices which are arranged in the measurement axis direction to output an identical phase displacement signal, and to form index gratings which are disposed between the light-receiving areas at the same time.

According to the present invention, another method of fabricating the sensor head has the following processes; (a) forming a transparent electrode on a transparent substrate, (b) forming a semiconductor layer on the transparent electrode, the semiconductor layer including an light-sensitive domain therein, (c) forming a first metal film on the semiconductor layer, (d) patterning the laminated film of the first metal film and the semiconductor layer to form light-receiving areas which are arranged on the transparent substrate at an interval to output different phase displacement signals, respectively, each of the light-receiving areas having a plurality of light-receiving devices which are arranged in the measurement axis direction to output an identical phase displacement signal, (e) forming an insulating layer to cover the light-receiving areas, (f) forming a second metal film on the insulating film, and (g) patterning the second metal film to form index gratings which are disposed between the light-receiving areas.

BRIEF DESCRIPTION OF THE DRAWINGS

FIG. 1B shows an arrangement of the sets of the light-receiving areas and index gratings in the embodiment;

FIG. 2 is a plan view of the sensor board in the embodiment;

FIG. 5 is a plan view of the sensor board in another embodiment;

FIG. 6A is a plan view of the sensor board in another embodiment;

FIG. 7A is a decomposition perspective view showing the optical encoder of another embodiment;

FIG. 7B shows an arrangement of the sets of the light-receiving areas and index gratings in the embodiment; and FIG. 8 is an expansion plan view of the sensor board of the embodiment.

DETAILED DESCRIPTION OF THE PREFERRED EMBODIMENTS

Hereafter, the embodiments of the present invention will be explained with reference to the drawings.

Figure 1A:
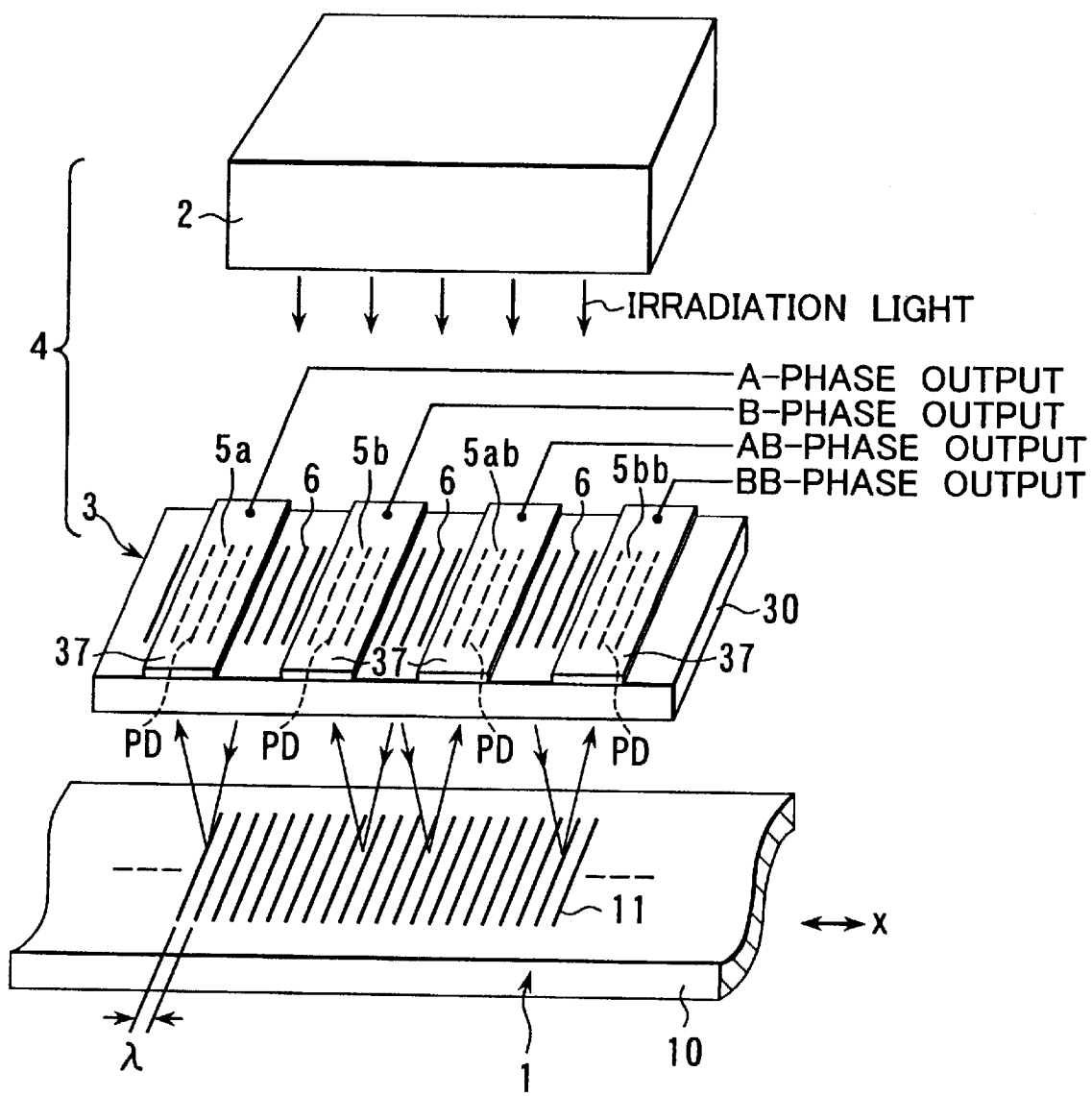
FIG. 1A is a disassemble perspective view showing an optical encoder according to an embodiment of this invention.

FIG. 1A shows a reflection-type optical encoder of an embodiment of this invention. The encoder has a reflection type scale 1 and a sensor head 4 which is opposed to the scale 1. The scale 1 has a substrate 10 and a reflection type scale grating 11 formed thereon at a pitch of $\lambda$ in a direction of a measurement axis x. The sensor head 4 has an irradiation light source 2 and a sensor board 3, and is disposed against the scale 1 so as to be relatively movable in the measurement axis x direction.

The sensor board 3 has a transparent substrate 30 formed of glass and the like, light-receiving areas 5 (5a,5b,5ab,5bb) formed on the transparent substrate 30 and index gratings 6 formed between the light-receiving areas 5 for modulating irradiation light. In other words, the light-receiving areas 5 and the index gratings 6 are alternately arranged in the measurement axis x direction of the scale 1. The irradiation light source 2 irradiates perpendicularly the index gratings 6 which are distributively disposed on the sensor board 3. The light-receiving areas 5 are disposed so as to output 4-phase (i.e., A-,B-,AB- and BB-phase) displacement signals that are 90° phase-shifted in order. Each of the light-receiving areas 5 is constituted including a plurality of light-receiving devices (i.e.,photo-diodes in this example) PD.

In a practical sensor board 3, as shown in FIG. 1B, four light-receiving areas 5, which output different phase displacement signals, respectively, are united as one set, and a plurality of sets, SET1, SET2, . . . are arranged in the measurement axis direction. The same phase output signal lines in the respective sets are commonly connected. Therefore, signal intensity and S/N can be improved.

Figure 3:
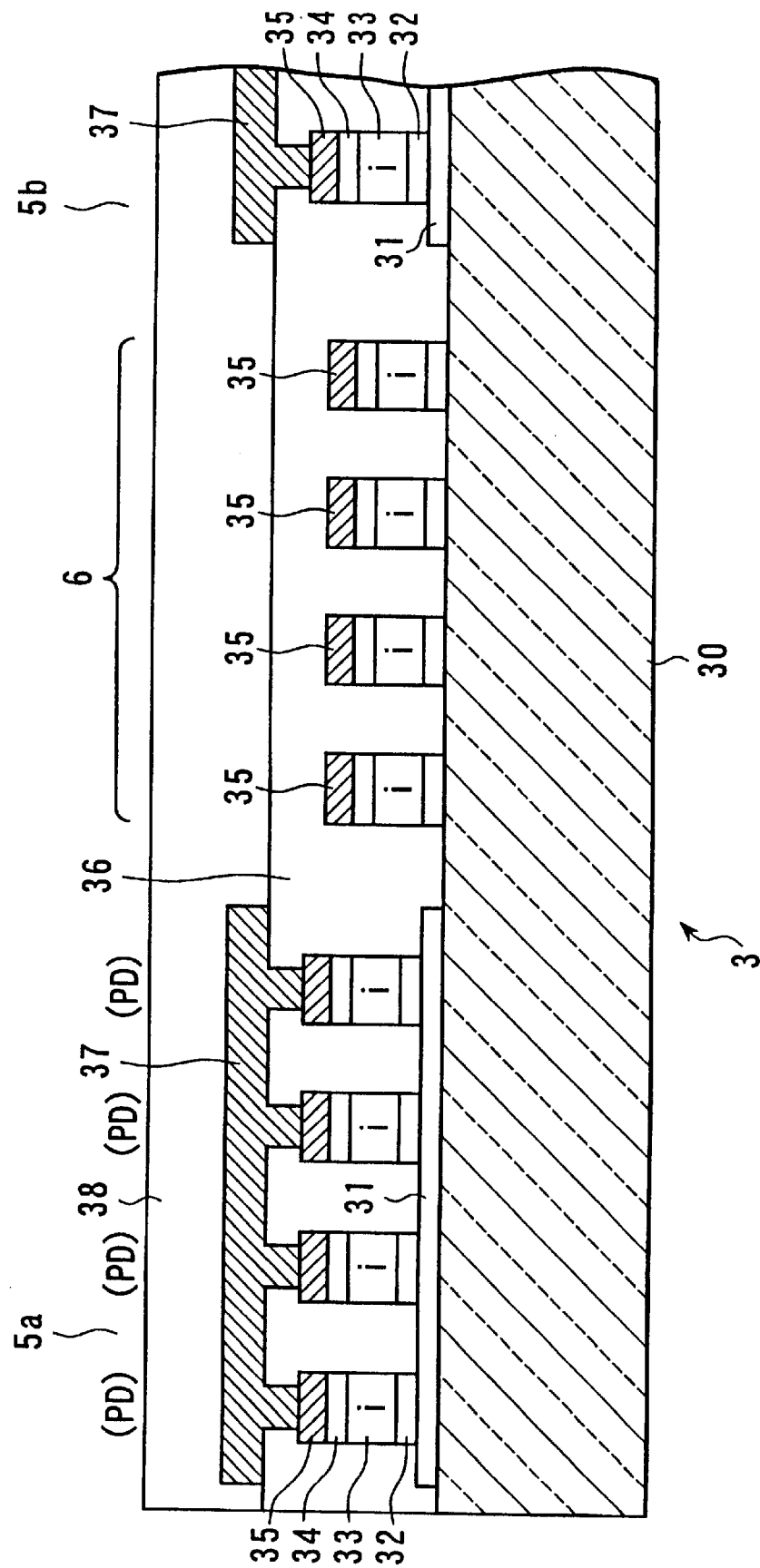
FIG. 3 is an A–A' sectional view of FIG. 2.

FIG. 2 is a plan view of the sensor board 3, and FIG. 3 is the A–A' sectional view. Transparent electrode 31, such as ITO, SnO2, ZnO, etc. that is p-side common electrode of each light-receiving area 5, are formed on the transparent substrate 30. On this transparent electrode 31, p-type semiconductor layer 32, i-type semiconductor layer 33, and n-type semiconductor layer 34 are laminated to form photo-diode PD, in which light-sensitive domain of p-i-n junction was formed. Metal electrode 35 is formed on n-type layer 34 of each photo-diode PD. The metal wiring 37 serving as an output signal line is formed so as to commonly connect the metal electrode 35 of the photo-diodes PD in each light-receiving area 5.

Although amorphous silicone is preferably used for the semiconductor layers 32, 33, and 34, other semiconductor layers, such as ZnSe and CdSe, can also be used. Moreover, the photo-diode may be formed with pn junction structure besides pin junction structure.

As shown in FIG. 3, the similar photo-diode structures as the region of the light-receiving area 5 are formed at the region of the index gratings 6 on the transparent substrate 30. However, these photo-diodes are dummy elements. The metal electrode 35 of the photo-diodes of these dummies are patterned to serve as non-transmitting portions of the index gratings 6.

The index gratings 6 are disposed in distribution in the form inserted between each light-receiving areas 5. The grating pitch of the index gratings 6 is the same as the scale grating pitch $\lambda$ (or more generally integral multiple of $\lambda$). The arrangement pitch P1 of the index gratings 6 distributed between the light-receiving areas 5 is taken as P1=n $\lambda$ (n is a positive integer). Moreover, since four photo-diodes PD included in each of the light-receiving areas 6 serve as to outputting the same phase displacement signal, the arrangement pitch is set to $\lambda$ (or more generally integral multiple of $\lambda$). The arrangement pitch P2 of the light-receiving areas 5 is taken as P2=(m+1/4) $\lambda$ (m is a positive integer). As a result, four phase (A-, B-, AB- and BB-phase) displacement signals will be output.

in general, in order to output four phase displacement signals, the arrangement pitch P2 of the light-receiving areas 5 is set as P2=(m+M/4) $\lambda$ (m is a positive integer and M is an odd number). For example, when M=3, A-, BB-, AB-, and B-phase displacement signals, that are 270° phase-shifted in order, are output.

In order to output three phase displacement signals, the arrangement pitch P2 of the light-receiving areas 5 is set as P2=(m+1/3) $\lambda$ (m is a positive integer).

As described above, the light-receiving areas 5 and the index gratings 6 are alternately arranged on the sensor board 3 in the state where the respective region does not overlap. For this reason, the material film of metal electrode 35 used for the light-receiving devices can be used for the index gratings 6 as it is.

It is as follows if the manufacturing process of the sensor board 3 is explained concretely. First, transparent electrode 31 is formed on the whole surface of the transparent substrate 30, and selection etching is carried out after a lithography process, and it leaves this only to the regions of the light-receiving areas 5. Subsequently, p-type, i-type, and n-type semiconductor layers 32, 33, and 34 are deposited, and metal electrode 35 is further deposited on this. Selection etching of these laminating films is carried out after a lithography process, whereby Photo-diodes PD are formed. At this time, the index gratings 6 are formed of the same metal material film as metal electrode 35 of Photo-diodes PD.

Then, on the whole substrate surface, an insulation film 36 is deposited. At this time, flatting process by CMP(Chemical Mechanical Polishing) is performed if needed. And the insulation film 36 is selectively etched to form contact holes, then metal wiring 37 serves as an output signal line is formed. The metal wiring 37 is further covered by the protection film (passivation film) 38 such as PSG film, etc. Although not illustrated, the opening to which a wiring pad is exposed is formed in the protection film 38.

Mask processes (i.e., lithorgaphy processes) can be performed for the following five processes at this manufacturing process.
(1) Patterning of the transparent electrode 31
(2) Patterning the laminated film of the semiconductor layer 33–34 and metal electrode 35
(3) Contact hole forming in the insulation film 36
(4) Patterning the metal wiring 37
(5) The wiring pad opening in the protection film 38

Incidentally, if it is going to form an index grating independently of the light-receiving areas, mask processes will become required seven processes.

As mentioned above, according to the embodiment, the light-receiving areas and index gratings of the sensor board may not be overlapped mutually, using the metal film in common. Therefore, the structure of the sensor board becomes simple and a small reflection-type encoder is obtained. Moreover, the manufacturing process has few mask processes and is easy.

Figure 4:
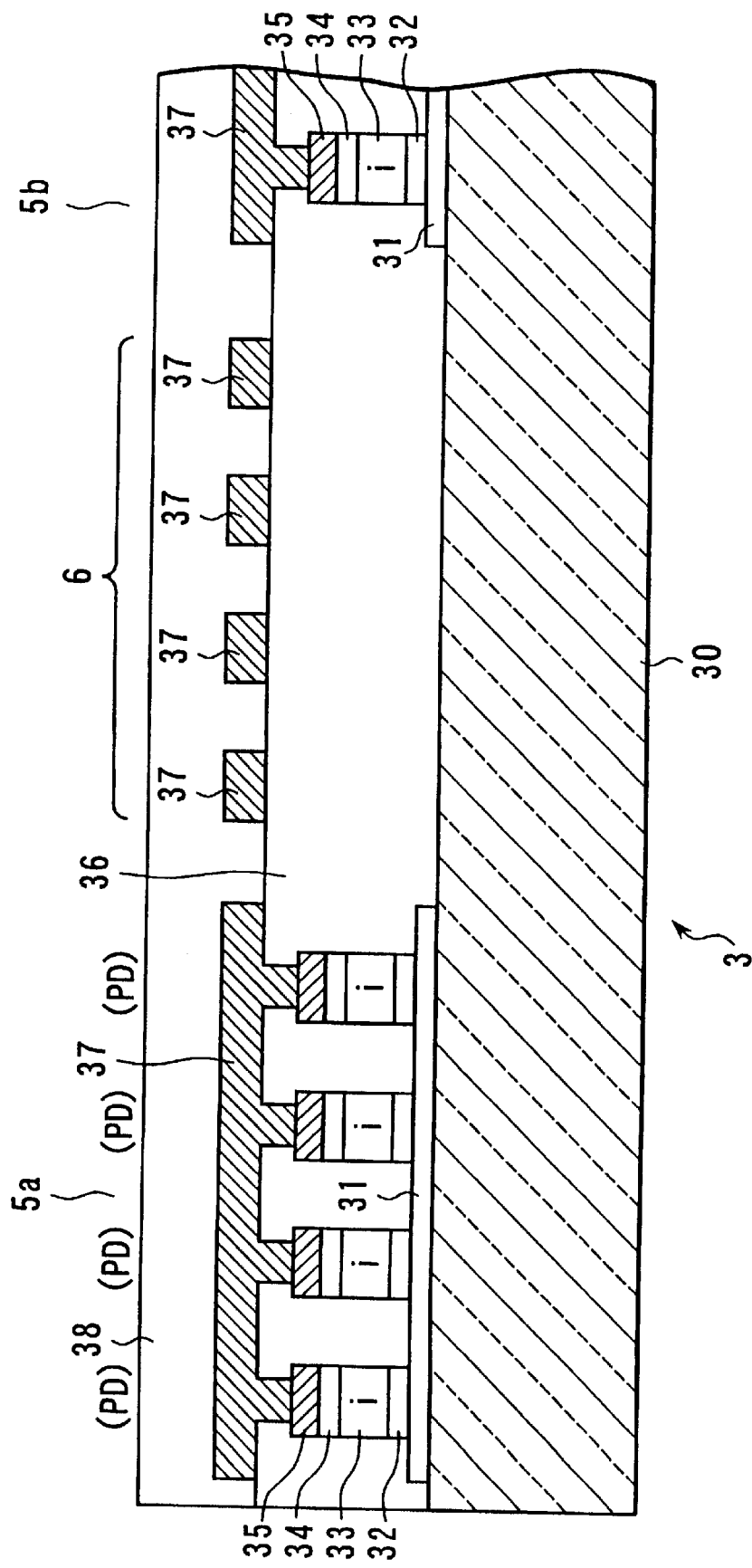
FIG. 4 is a sectional view corresponding to FIG. 3 in another embodiment.

FIG. 4 shows a section of the sensor board 3 according to another embodiment, corresponding to FIG. 3. In this structure, a semiconductor layer is completely removed in the region of the index gratings 6, and there is no dummy photo-diode. The index gratings 6 is formed by patterning the same material film as the metal wiring 37. Also in this case, the manufacturing process is the same as that of the form of previous embodiment, and a mask process can be managed with five processes.

The combination of the structures of FIG. 3 and FIG. 4 is also possible. That is, as shown in FIG. 4, the index gratings 6 are formed using the metal wiring 37, in addition it forms in the region of the index gratings 6 the dummy photo-diode, as shown in FIG. 3. In this case, the index grating will be determined by metal electrode 25 of the dummy element, and overlap of the metal wiring 37 on it.

FIG. 5 is a plan view corresponding to FIG. 2 about the sensor board 3 according to another embodiment. In this sensor board 3, the photo-diodes PD in each light-receiving area 5 is patterned in one body such that the semiconductor layers and the electrodes may continue in the connection portion 51.

The connection portion 51 serves as a contact of the metal wiring 37. As a result, the metal wiring 37, which is connected to the plural photo-diodes PD, can be made with low contact resistivity.

Further, FIG. 6A shows a plan view of the sensor board 3 according to another embodiment, corresponding to FIGS. 2 and 5. In this embodiment, three units, UNIT1, UNIT2 and UNIT3, are arranged in a direction perpendicular to the measurement axis x in such a state that each unit has two or more light-receiving areas 5 and the index gratings 6, alternately arranged in the measurement axis x direction. In this example, these units UNIT1–UNIT3 are phase-shifted by λ (generally, integral multiple of λ) in order in the measurement axis direction.

In other words, in FIG. 6A, each of the light-receiving areas 5a,5b, . . . in the above-described embodiment is divided into three light-receiving areas (5a1,5a2,5a3),(5b1, 5b2, 5b3) . . . , and each of the index gratings 6 is similarly divided into three index gratings (61,62,63), and then divided portions are arranged in the direction which intersects obliquely with the measurement axis x. In this case, since three units UNIT1–UNIT3 should have the same phase, the metal wiring 37 of the light-receiving areas 5 is patterned as to incline to the measurement axis x and commonly connect three units UNIT1–UNIT3.

Figure 6B:
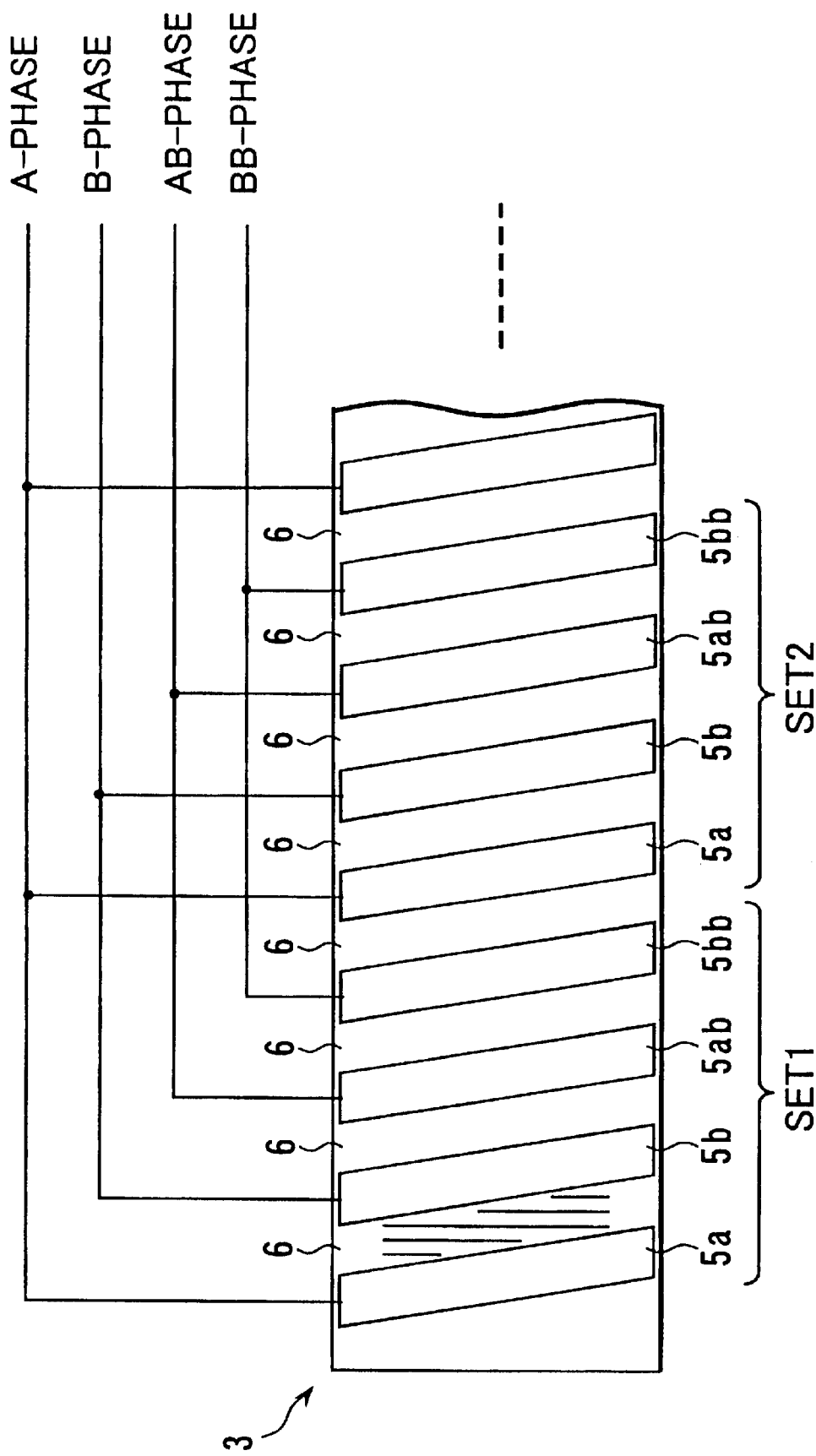
FIG. 6B shows an arrangement of the sets of the light-receiving areas and index gratings in the embodiment.

In this case, as shown in FIG. 6B, four light-receiving areas 5, which is to output four phase signals of A,B,AB, and BB, are included in one set, and a plurality of sets, SET1, SET2, . . . are arranged in the measurement axis direction. And the same phase output signal lines in the sets are commonly connected. In a case of three-phase system, three light-receiving areas 5, which are phase-shifted by (m+1/3) for three phase, are included in one set, and a plurality of sets are arranged in the measurement axis direction. Thereby, the signal intensity and the improvement in S/N can be achieved.

The manufacturing process of the sensor board 3 of this embodiment is the same as that of the above-described embodiment. That is, the index gratings 6 are formed using the electrode metal or wiring metal of the light-receiving areas 5. By use of such a layout, when the irradiation light intensity is variable in the direction perpendicular to the measurement axis x, the influence of the variation can be reduced.

FIG. 7A shows another optical encoder, corresponding to FIG. 1A. The scale 1 is the same as the embodiment of FIGS. 1A and 1B. In this sensor board 3, the light-receiving areas 5 and the index gratings 6 are alternately arranged in a direction perpendicular to the measurement axis x. FIG. 8 shows the expanded plan view of the sensor board 3.

Each light-receiving area 5 contains plural photo-diodes PD like the previous embodiment. In the example of FIG. 8, plural units, UNIT1, UNIT2, of the light-receiving areas are arranged in the measurement axis x direction by making into one unit for two or more photo-diodes PD formed continuously. However, the photo-diodes PD located in line in the measurement axis x direction should output the same phase displacement signal. Therefore, the photo-diodes PD can be separated like the example of FIG. 2, without constituting a unit.

As for the photo-diode PD located in line in the measurement axis x direction, the top metal electrodes are commonly connected by the metal wiring 37. Between the light-receiving areas 5 (5a, 5b, 5ab, 5bb) arranged in the direction which intersects perpendicularly with the measurement axis x, as shown in FIG. 8, the phases are shifted by $\lambda/4$ in order in the measurement axis x. This phase shift can be set to 3 $\lambda/4$, or more generally can be set to $\lambda(m+M/4)$ (m is a positive integer and M is odd number). The index gratings 6 arranged between each light-receiving areas 5 has the same phase altogether. As a result, A-, B-, AB- and BB-phase displacement signals can be output from each light-receiving areas 5.

In this embodiment, as shown in FIG. 7B, the light-receiving areas 5 and the index gratings 6 are arranged to have two or more sets, using a part for 4 phases of A-, B-, AB-, and BB- as one set, and the same phase output signal line of each set is commonly connected. In a case of three-phase system, three light-receiving areas 5, which are phase-shifted by (m+1/3), are included in one set, and a plurality of sets are arranged in the measurement axis direction. Thereby, the signal intensity and the improvement in S/N can be achieved.

The sensor board of this embodiment can also be manufactured at the same process as the previous embodiment, and the index gratings 6 are formed using the top electrode metal or wiring metal of the light-receiving areas 5. Therefore, according to this embodiment as well as the previous embodiment, a small reflection type encoder can be made from an easy process.

What is necessary is, for an irradiation light source, just to be able to carry out the perpendicular and substantially equalized irradiation of the index gratings distributed by two or more places of a sensor board, in the optical encoder of this invention.

According to this invention, the sensor head of a optical encoder is constituted by a sensor board formed in the state described above where the light-receiving areas and the index gratings are alternately arranged. Since the regions of the index gratings do not overlap with the light-receiving areas, this sensor board structure is simple. Therefore, a small reflection-type encoder can be obtained. And since the index gratings can be formed using the same material as metal electrode or metal wiring used for the light-receiving areas, the manufacturing process of a sensor head also becomes easy.

What is claimed is:

1. A method of fabricating a sensor head of an optical encoder which comprises a scale on which a reflection type scale grating is formed at a pitch in a measurement axis direction, and the sensor head for sensing the scale, the sensor head being disposed to be relatively movable along the measurement axis, the method having the steps of:

forming a transparent electrode on a transparent substrate;

forming a semiconductor layer on said transparent electrode, said semiconductor layer including a light-sensitive domain therein;

forming a metal film on said semiconductor layer, to get a laminated film made of said metal film and said semiconductor layer patterning said laminated film of said metal film and said semiconductor layer to form light-receiving areas which are arranged at an interval to output different phase displacement signals, respectively, each of said light-receiving areas having a plurality of light-receiving devices which are arranged in the measurement axis direction to output an identical phase displacement signal, and to form index gratings which are disposed between said light-receiving areas at the same time;

forming an insulating layer on said substrate having said light-receiving areas and said index gratings; and forming an output signal line which commonly connects said plurality of light-receiving devices in each of said light-receiving areas, respectively, on said insulating layer.

2. A method of fabricating a sensor head of an optical encoder which comprises a scale on which a reflection type scale grating is formed at a pitch in a measurement axis direction, and the sensor head for sensing the scale, the sensor head being disposed to be relatively movable along the measurement axis, the method having the steps of:

forming a transparent electrode on a transparent substrate;

forming a semiconductor layer on said transparent electrode, said semiconductor layer including an light-sensitive domain therein;

forming a first metal film on said semiconductor layer to get a laminated film made of said first metal film and said semiconductor layer;

patterning said laminated film of said first metal film and said semiconductor layer to form light-receiving areas which are arranged on said transparent substrate at an interval to output different phase displacement signals, respectively, each of said light-receiving areas having a plurality of light-receiving devices which are arranged in the measurement axis direction to output an identical phase displacement signal;

forming an insulating layer to cover said light-receiving areas;

forming a second metal film on said insulating layer; and patterning said second metal film to form an output signal line which commonly connects said plurality of light-receiving devices in each of said light-receiving areas, respectively, and to form index gratings which are disposed between said light-receiving areas at the same time.

3. An optical encoder comprising, a scale on which a reflection type scale grating is formed at a pitch in a measurement axis direction, and a sensor head for sensing the scale, said sensor head being disposed to be relatively movable along the measurement axis, wherein said sensor head comprises:

a transparent substrate;

a transparent electrode which is formed on said transparent substrate;

a semiconductor layer which is formed on said transparent electrode, said semiconductor layer including a light-sensitive domain therein;

a metal film which is formed on said semiconductor layer to get a laminated film made of said metal film and said semiconductor layer;

light-receiving areas which are formed by patterning said laminated film of said metal film and said semiconductor layer, said light-receiving areas arranged at an interval to output different phase displacement signals, respectively, each of said light-receiving areas having a plurality of light-receiving devices which are arranged in the measurement axis direction to output an identical phase displacement signal;

index gratings which are formed at the same time with said light-receiving areas by patterning said laminated film of said metal film and said semiconductor layer, said index gratings being disposed between said light-receiving areas;

an insulating layer which is formed on said transparent substrate having said light-receiving areas and said index gratings; and an output signal line which is formed on said insulating layer, said output signal line commonly connecting said plurality of light-receiving devices in each of said light-receiving areas, respectively.

4. The optical encoder according to claim 3, wherein said semiconductor layers in each of said light-receiving areas are separated from each other.

5. The optical encoder according to claim 3, wherein said semiconductor layers in each of said light-receiving areas are patterned in one body such that said semiconductor layers may continue with interconnection parts.

6. The optical encoder according to claim 3, wherein said light-receiving areas are arranged in the measurement axis direction as to sandwich said index gratings therebetween.

7. The optical encoder according to claim 6, wherein said light-receiving areas are arranged at a pitch of $(m+M/4)\lambda$ (where, $\lambda$ is the scale grating pitch, m is a positive integer, and M is odd number).

8. The optical encoder according to claim 6, wherein said light-receiving areas are arranged at a pitch of $(m+1/3)\lambda$ (where, $\lambda$ is the scale grating pitch, and m is a positive integer).

9. The optical encoder according to claim 6, wherein a plurality of sets of said light-receiving areas are arranged in the measurement axis direction, each set having a plurality of said light-receiving areas which output different phase displacement signals, respectively, said output signal lines of the same phase in the respective sets being connected in common.

10. The optical encoder according to claim 6, wherein a plurality of units, each unit consisting of an arrangement of said light-receiving areas in the measurement axis direction, are arranged in a direction perpendicular to the measurement axis, said each unit being shifted along one direction in the measurement axis with an integral multiple of the scale grating pitch.

11. The optical encoder according to claim 3, wherein said light-receiving areas are arranged in a direction perpendicular to the measurement axis as to sandwich said index gratings therebetween.

12. The optical encoder according to claim 11, wherein said light-receiving areas are phase-shifted by $(m+M/4)\ \lambda$ (where, $\lambda$ is the scale grating pitch, m is a positive integer, and M is an odd number) in order in the measurement axis direction.

13. The optical encoder according to claim 11, wherein said light-receiving areas are phase-shifted by $(m+1/3)\ \lambda$ (where, $\lambda$ is the scale grating pitch, and m is a positive integer) in order in the measurement axis direction.

14. The optical encoder according to claim 11, wherein a plurality of sets of said light-receiving areas are arranged in a direction perpendicular to the measurement axis, each set having a plurality of said light-receiving areas which output different phase displacement signals, respectively, said output signal lines of the same phase in the respective sets being connected in common.

15. An optical encoder comprising, a scale on which a reflection type scale grating is formed at a pitch in a measurement axis direction, and a sensor head for sensing the scale, said sensor head being disposed to be relatively movable along the measurement axis, wherein said sensor head comprises:

a transparent substrate;

a transparent electrode which is formed on said transparent substrate;

a semiconductor layer which is formed on said transparent electrode, said semiconductor layer including a light-sensitive domain therein;

a first metal film which is formed on said semiconductor layer to get a laminated film made of said first metal film and said semiconductor layer;

light-receiving areas which are formed by patterning said laminated film of said first metal film and said semiconductor layer, said light-receiving areas arranged on said transparent substrate at an interval to output different phase displacement signals, respectively, each of said light-receiving areas having a plurality of light-receiving devices which are arranged in the measurement axis direction to output an identical phase displacement signal;

an insulating layer which covers said light-receiving areas;

a second metal film which is formed on said insulating layer;

an output signal line which is formed by patterning said second metal film, said output signal line commonly connecting said plurality of light-receiving devices in each of said light-receiving areas, respectively; and index gratings which are formed at the same time with said output signal line by patterning said second metal film, said index gratings being disposed between said light-receiving areas.

16. The optical encoder according to claim 15, wherein said semiconductor layers in each of said light-receiving areas are separated from each other.

17. The optical encoder according to claim 15, wherein said semiconductor layers in each of said light-receiving areas are patterned in one body such that said semiconductor layers may continue with interconnection parts.

18. The optical encoder according to claim 15, wherein said light-receiving areas are arranged in the measurement axis direction as to sandwich said index gratings therebetween.

19. The optical encoder according to claim 18, wherein said light-receiving areas are arranged at a pitch of $(m+M/4)\ \lambda$ (where, $\lambda$ is the scale grating pitch, m is a positive integer, and M is odd number).

20. The optical encoder according to claim 18, wherein said light-receiving areas are arranged at a pitch of $(m+1/3)\ \lambda$ (where, $\lambda$ is the scale grating pitch, and m is a positive integer).

21. The optical encoder according to claim 18, wherein a plurality of sets of said light-receiving areas are arranged in the measurement axis direction, each set having a plurality of said light-receiving areas which output different phase displacement signals, respectively, said output signal lines of the same phase in the respective sets being connected in common.

22. The optical encoder according to claim 18, wherein a plurality of units, each unit consisting of an arrangement of said light-receiving areas in the measurement axis direction, are arranged in a direction perpendicular to the measurement axis, said each unit being shifted along one direction in the measurement axis with an integral multiple of the scale grating pitch.

23. The optical encoder according to claim 15, wherein said light-receiving areas are arranged in a direction perpendicular to the measurement axis as to sandwich said index gratings therebetween.

24. The optical encoder according to claim 23, wherein said light-receiving areas are phase-shifted by $(m+M/4)\ \lambda$ (where, $\lambda$ is the scale grating pitch, m is a positive integer, and M; an odd number) in order in the measurement axis direction.

25. The optical encoder according to claim 23, wherein said light-receiving areas are phase-shifted by $(m+1/3)\ \lambda$ (where, $\lambda$ is the scale grating pitch, and m is a positive integer) in order in the measurement axis direction.

26. The optical encoder according to claim 23, wherein a plurality of sets of said light-receiving areas are arranged in a direction perpendicular to the measurement axis, each set having a plurality of said light-receiving areas which output different phase displacement signals, respectively, said output signal lines of the same phase in the respective sets being connected in common.

* * * * *